United States Patent
Miyashita et al.

(10) Patent No.: US 12,323,016 B2
(45) Date of Patent: Jun. 3, 2025

(54) STATOR AND METHOD OF MANUFACTURING STATOR

(71) Applicant: HONDA MOTOR CO., LTD., Tokyo (JP)

(72) Inventors: Keita Miyashita, Tokyo (JP); Hideki Shigematsu, Tokyo (JP); Yasuyuki Kimura, Tokyo (JP); Yuichi Hosoda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 385 days.

(21) Appl. No.: 17/676,251

(22) Filed: Feb. 21, 2022

(65) Prior Publication Data

US 2022/0311318 A1    Sep. 29, 2022

(30) Foreign Application Priority Data

Mar. 29, 2021   (JP) .................................. 2021-054847

(51) Int. Cl.
| | |
|---|---|
| *H02K 15/085* | (2006.01) |
| *H02K 1/16* | (2006.01) |
| *H02K 3/12* | (2006.01) |
| *H02K 3/32* | (2006.01) |

(52) U.S. Cl.
CPC ............ *H02K 15/085* (2013.01); *H02K 1/16* (2013.01); *H02K 3/12* (2013.01); *H02K 3/32* (2013.01)

(58) Field of Classification Search
CPC .......... H02K 15/085; H02K 1/16; H02K 3/12; H02K 3/32
USPC ........................................ 310/179, 198, 201
See application file for complete search history.

(56) References Cited

U.S. PATENT DOCUMENTS

| | | | | |
|---|---|---|---|---|
| 2013/0300246 A1* | 11/2013 | Kaimori | .................. | B60L 15/20 |
| | | | | 310/201 |
| 2018/0205300 A1* | 7/2018 | Fujimori | .................. | H01B 3/52 |
| | | | | 310/215 |
| 2020/0083771 A1 | 3/2020 | Azusawa et al. | | |

FOREIGN PATENT DOCUMENTS

| | | | | | |
|---|---|---|---|---|---|
| CN | 102020123903 A1 | * | 3/2022 | ............... | H02K 3/12 |
| JP | 2009081980 A | * | 4/2009 | | |
| JP | 2012139075 A | | 7/2012 | | |
| JP | 2020043706 | * | 3/2020 | ............. | H02K 1/148 |
| JP | 2020043706 A | * | 3/2020 | ............. | H02K 1/148 |

(Continued)

OTHER PUBLICATIONS

DE 102020123903 A1 translation, 2022 (Year: 2022).*

(Continued)

*Primary Examiner* — Jose A Gonzalez Quinones
(74) *Attorney, Agent, or Firm* — CKC & Partners Co., LLC (57) ABSTRACT

A stator includes a stator core having a plurality of slots, and a plurality of segment coils, each of which has an insulating film, the plurality of segment coils each including an inclined portion and a rising portion. the rising portions that are adjacent to each other in a radial direction of the stator core being joined to each other. Each of the plurality of segment coils includes first peeled portions each in which the insulating film facing the circumferential direction of the stator core is peeled in a lengthwise direction, and second peeled portions each in which the insulating film facing the radial direction of the stator core is peeled in the lengthwise direction, and a peeling length of the first peeled portion is longer than a peeling length of the second peeled portion.

7 Claims, 8 Drawing Sheets

(56) References Cited

FOREIGN PATENT DOCUMENTS

| JP | 2021044973 | * | 3/2021 | ............. | H02K 15/04 |
| WO | WO-2017038310 A1 | * | 3/2017 | ............... | H02K 1/16 |

OTHER PUBLICATIONS

JP2021044973 translation 2021 (Year: 2021).*
JP2020043706 translation 2020 (Year: 2020).*
Office Action issued Apr. 16, 2025 in the CN Patent Application No. 202210173574.3.

* cited by examiner

STATOR AND METHOD OF MANUFACTURING STATOR

This application is based on and claims the benefit of priority from Japanese Patent Application No. 2021-054847, filed on 29 Mar. 2021, the content of which is incorporated herein by reference.

BACKGROUND OF THE INVENTION

Field of the Invention

The present invention relates to a stator and a method of manufacturing the stator.

Related Art

There has been conventionally known a stator in which a plurality of segment coils each having an insulating film are inserted into slots of a stator core and ends of the plurality of segment coils adjacent to each other in a radial direction of the stator core are joined and connected to each other (for example, see Patent Document 1).

Each of the segment coils after being inserted into the respective slots has an inclined portion formed by bending the end of the segment coil protruding from the slot obliquely in the circumferential direction of a stator core, and a rising portion formed by bending a tip end side of the inclined portion to rise in an axial direction of the stator core. Each of the rising portions has a peeled portion in which an insulating film is peeled, the rising portions are arranged to be adjacent to each other in the radial direction of the stator core, and the segment coils are connected by joining the respective peeled portions to each other.

In the above-described stator of the related art, the peeled portion in the segment coil is formed so that a peeling length of the insulating film from a tip end of the segment coil on a side facing the radial direction of the stator core in the end of the segment coil is longer than that on a side facing the circumferential direction of the stator core in the end of the segment coil.

Patent Document 1: Japanese Unexamined Patent Application, Publication No. 2012-139075

SUMMARY OF THE INVENTION

When the segment coil after being inserted into the slot is bent to form the rising portion, the strong tensile strength acts on the insulation film located outside of the bending direction, and the strong compression stress acts on the insulating film located inside of the bending direction. This easily causes damage such as cracks to the insulating film, which may decrease the quality of the stator. In order to prevent such damage to the insulating film, it is necessary to extend the peeling length of the peeled portion facing the radial direction of the stator core so as to include a bent position in the rising portion.

Figure 11:
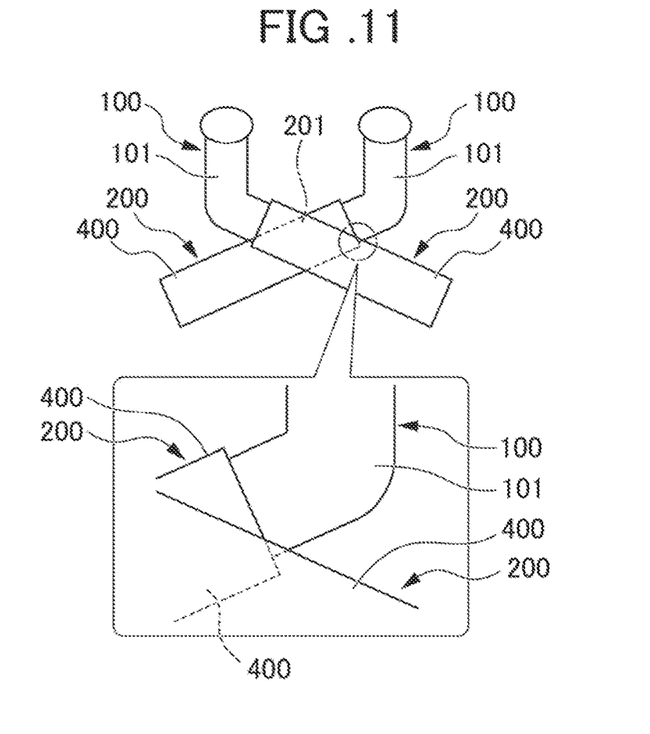
FIG. 11 is a front view illustrating an intersection between inclined portions in conventional segment coils.
Figure 12:
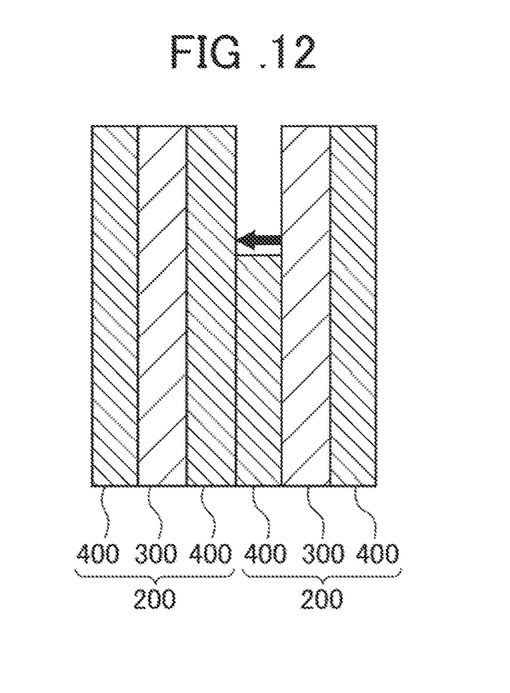
FIG. 12 is a schematic diagram of a cross section of the intersection between the inclined portions in the conventional segment coils.

However, since the inclined portion in the segment coil inserted into the slot intersects the inclined portion in another segment coil that is adjacent in the radial direction of the stator core, when the peeling length of the peeled portion is extended, a part of a peeled portion 101 in a rising portion 100 facing the radial direction of the stator core may come closer to or may be present in an intersection 201 with an inclined portion 200 of an adjacent segment coil of a different phase as illustrated in FIG. 11. In this case, as illustrated in FIG. 12, in the intersection 201, a partial lack site occurs in an insulating film 400, whereby partial discharge indicated by an arrow may occur through the partial lack site. In order to avoid the occurrence of the partial discharge, it is necessary to increase the thickness of the insulating film 400 to ensure a large distance between conductors 300 and 300 of the respective segment coils, which causes an increase in weight of the stator and an increase in cost.

Therefore, an object of the present invention is to provide a stator having good insulation properties even when an insulating film is formed with a small thickness, by preventing damage to the insulating film due to bending of a rising portion in a segment coil and preventing a peeled portion in which the insulating film is peeled in the rising portion from intersecting a segment coil that is adjacent in a radial direction of a stator core, and a method of manufacturing the stator.

(1) A stator according to the present invention is a stator (e.g., a stator 1, which will be described later) comprising a stator core (e.g., a stator core 2, which will be described later) having a plurality of slots (e.g., slots 22, which will be described later), and a plurality of segment coils (e.g., segment coils 4, which will be described later), each of which is to be inserted into the slots and has an insulating film (e.g., an insulating film 46, which will be described later), the plurality of segment coils each including an inclined portion (e.g., an inclined portion 44, which will be described later) that protrudes from the slot to an outside in an axial direction (e.g., a Z direction, which will be described later) of the stator core and is bent obliquely in a circumferential direction (e.g., an X direction, which will be described later) of the stator core, and a rising portion (e.g., a rising portion 45, which will be described later) formed by bending a tip end side of the inclined portion to rise in the axial direction of the stator core, the rising portions that are adjacent to each other in a radial direction (e.g., a Y direction, which will be described later) of the stator core being joined to each other, wherein each of the plurality of segment coils includes first peeled portions (e.g., first peeled portions 47a, which will be described later) each in which the insulating film facing the circumferential direction of the stator core is peeled in a lengthwise direction from a tip end (e.g., a tip end 45a, which will be described later) of the rising portion toward the inclined portion, and second peeled portions (e.g., second peeled portions 47b, which will be described later) each in which the insulating film facing the radial direction of the stator core is peeled in the lengthwise direction from the tip end of the rising portion toward the inclined portion, and a peeling length (e.g., a peeling length L1, which will be described later) of the first peeled portion is longer than a peeling length (e.g., a peeling length L2, which will be described later) of the second peeled portion.

(2) In the stator according to the above-described (1), a first boundary portion (e.g., a first boundary portion 48a, which will be described later) between the first peeled portion and the insulating film may be arranged on the inclined portion side with respect to a bent position (e.g., bent positions P1 and P2, which will be described later) of the rising portion.

(3) In the stator according to the above-described (1) or (2), the inclined portions in the segment coils that are adjacent to each other in the radial direction of the stator core may be arranged to intersect each other, and each second boundary portion (e.g., second boundary portions 48b, which will be described later) between the second peeled portion and the insulating film may be arranged on the tip end side of the rising portion with respect to an intersection (e.g., an intersection 440, which will be described later).

(4) In the stator according to any one of the above-described (1) to (3), the first peeled portion has a constricted portion (a constricted portion 49*a*, 49*b*, which will be described later) in a vicinity of a corresponding first boundary portion (e.g., a first boundary portion 48*a*, which will be described later) between the first peeled portion and the insulating film.

(5) A method of manufacturing a stator according to the present invention is a method of manufacturing a stator (e.g., a stator 1, which will be described later) comprising a stator core (e.g., a stator core 2, which will be described later) having a plurality of slots (e.g., slots 22, which will be described later), and a plurality of segment coils (e.g., segment coils 4, which will be described later), each of which is to be inserted into the slots and has an insulating film (e.g., an insulating film 46, which will be described later), the plurality of segment coils each including an inclined portion (e.g., an inclined portion 44, which will be described later) that protrudes from the slot to an outside in an axial direction (e.g., a Z direction, which will be described later) of the stator core and is bent obliquely in a circumferential direction (e.g., an X direction, which will be described later) of the stator core, and a rising portion (e.g., a rising portion 45, which will be described later) formed by bending a tip end side of the inclined portion to rise in the axial direction of the stator core, the rising portions that are adjacent to each other in a radial direction (e.g., a Y direction, which will be described later) of the stator core being joined to each other, the method comprising a peeling step of forming, in each of the plurality of segment coils before being inserted into the slots, first peeled portions (e.g., first peeled portions 47*a*, which will be described) each in which the insulating film facing the circumferential direction of the stator core is peeled in a lengthwise direction from a site corresponding to a tip end (e.g., a tip end 45*a*, which will be described later) of the rising portion toward a site corresponding to the inclined portion, and second peeled portions (e.g., second peeled portions 47*b*, which will be described later) each in which the insulating film facing the radial direction of the stator core is peeled in the lengthwise direction from a site corresponding to the tip end of the rising portion toward a site corresponding to the inclined portion, wherein in the peeling step, a peeling length (e.g., a peeling length L1, which will be described later) of the insulating film of the first peeled portion is longer than a peeling length (e.g., a peeling length L2, which will be described later) of the insulating film of the second peeled portion.

According to the above-described (1), since the peeling length of the first peeled portion facing the circumferential direction of the stator core is longer than the peeling length of the second peeled portion facing the radial direction of the stator core, it is possible to provide the stator having good insulation properties even when the insulating film is formed with a small thickness, by preventing damage to the insulating film arranged outside and inside in the bending direction when the rising portion in the segment coil is bent in the circumferential direction of the stator core to rise, and, at the same time, preventing the peeled portion from intersecting the segment coil that is adjacent in the radial direction of the stator core.

According to the above-described (2), since the first boundary portion between the first peeled portion and the insulating film of the present embodiment is arranged on the inclined portion side with respect to the bent position of the rising portion, it is possible to reliably prevent the insulating film from being present in the bent site of the rising portion. Accordingly, the damage to the insulating film can be prevented more reliably.

According to the above-described (3), since each second boundary portion between the second peeled portion and the insulating film is arranged on the tip end side of the rising portion with respect to the intersection between the inclined portions, it is possible to more reliably prevent the second peeled portion from intersecting the inclined portion in the segment coil that is adjacent in the radial direction of the stator core.

According to the above-described (4), since the use of the constricted portions in the vicinity of the respective first boundary portions between the first peeled portion and the insulating film enables the rising portion to be bent, the rising portion can be easily bent and formed, and the compression stress hardly acts on the inside in the bending direction, which makes it possible to prevent radial expansion of the segment coil from occurring inside in the bending direction due to the compression stress.

According to the above-described (5), since the peeling length of the first peeled portion facing the circumferential direction of the stator core is longer than the peeling length of the second peeled portion facing the radial direction of the stator core, it is possible to easily manufacture the stator having good insulation properties even when the insulating film is formed with a small thickness, by preventing damage to the insulating film arranged outside and inside in the bending direction when the rising portion in the segment coil is bent in the circumferential direction of the stator core to rise, and, at the same time, preventing the peeled portion from intersecting the segment coil that is adjacent in the radial direction of the stator core.

DETAILED DESCRIPTION OF THE INVENTION

Figure 1:
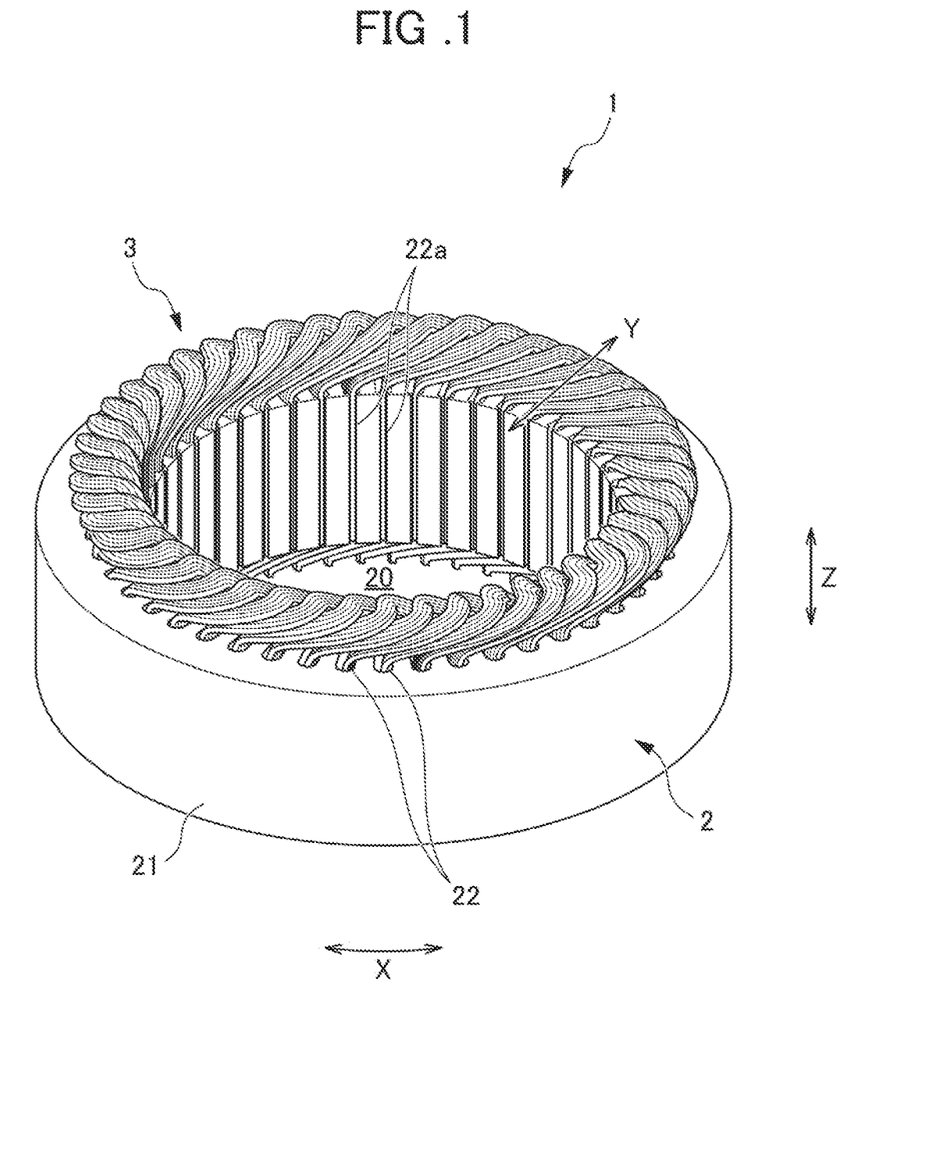
FIG. 1 is a perspective view illustrating a stator.
Figure 2:
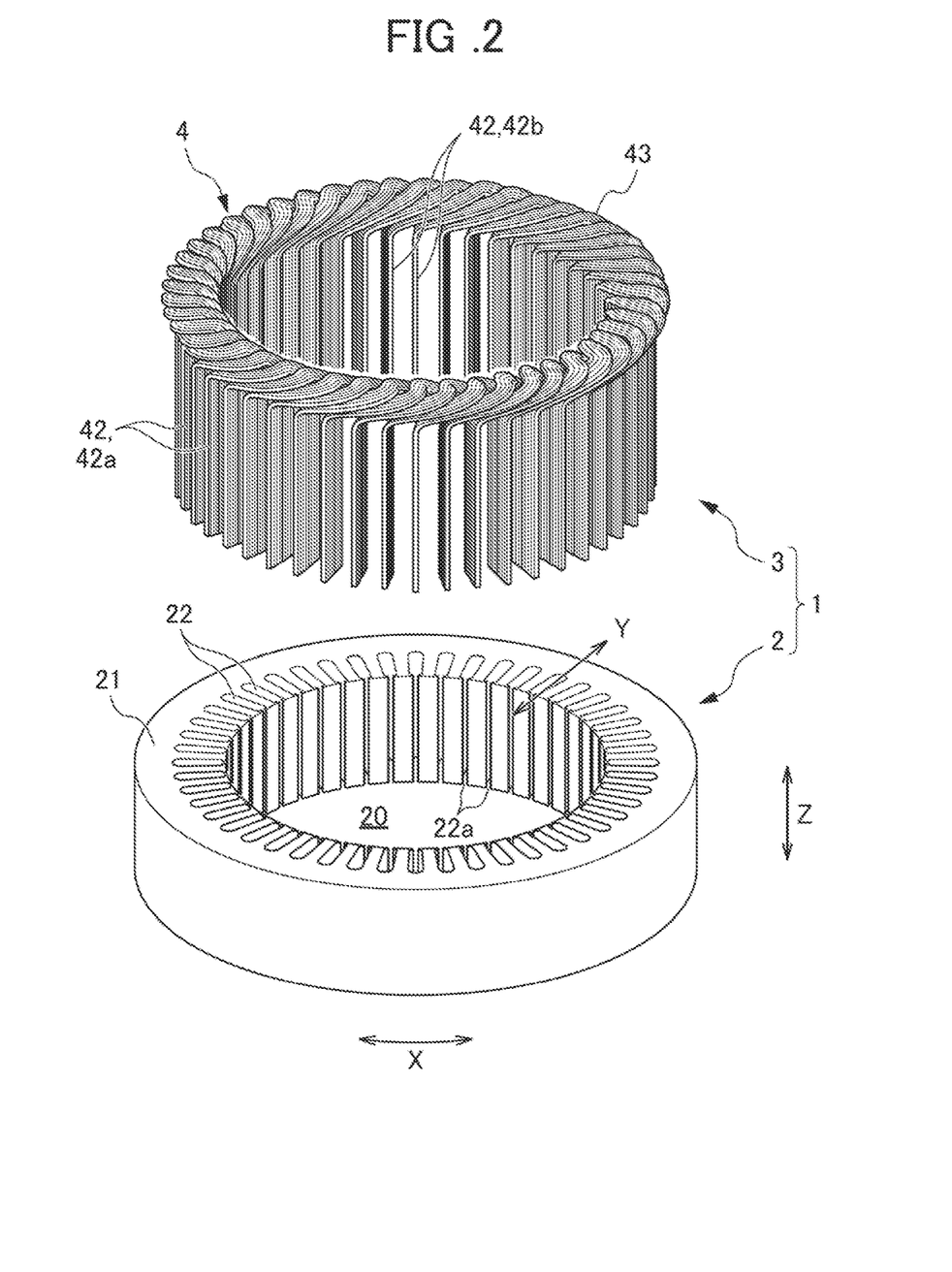
FIG. 2 is an exploded perspective view illustrating a stator core and segment coils.

Hereinafter, a stator according to the present embodiment and a method of manufacturing the stator will be described with reference to the drawings. As illustrated in FIGS. 1 and 2, a stator 1 is, for example, a stator of a rotating electrical machine, and includes a stator core 2 and a coil 3 to be mounted in the stator core 2.

The stator core 2 has an annular portion 21 formed of a stacked body in which a plurality of thin core plates are stacked, for example. The annular portion 21 has a through hole 20 formed at a center thereof, the through hole 20 passing through in an axial direction, and has a plurality of slots 22 passing through in the axial direction of the stator core 2. The slots 22 are arranged radially at constant intervals along a circumferential direction of the annular portion 21, and have respective openings 22*a* that are open toward the through hole 20. Note that in the stator 1 and the stator core 2, as indicated by arrows in FIGS. 1 to 4, an X direction in which the slots 22 are arranged indicates the circumferential direction, a Y direction along a radial direction from a center of the through hole 20 indicates the radial direction, and a Z direction perpendicular to the Y direction indicates the axial direction.

The coil 3 is a collection of a plurality of segment coils 4 each including a conductor 41 (see FIG. 5) formed substantially into a U shape, the conductor 41 being made of a rectangular wire having a rectangular cross section. The plurality of segment coils 4 are bundled, and are inserted into the slots 22 along the axial direction of the stator core 2 as illustrated in FIG. 2. In the segment coils 4 inserted into the slots 22, ends thereof protruding from a side opposite to the insertion side toward the outside in the axial direction of the stator core 2 are bent, and the bent ends are joined to each other by laser welding or the like.

Figure 3:
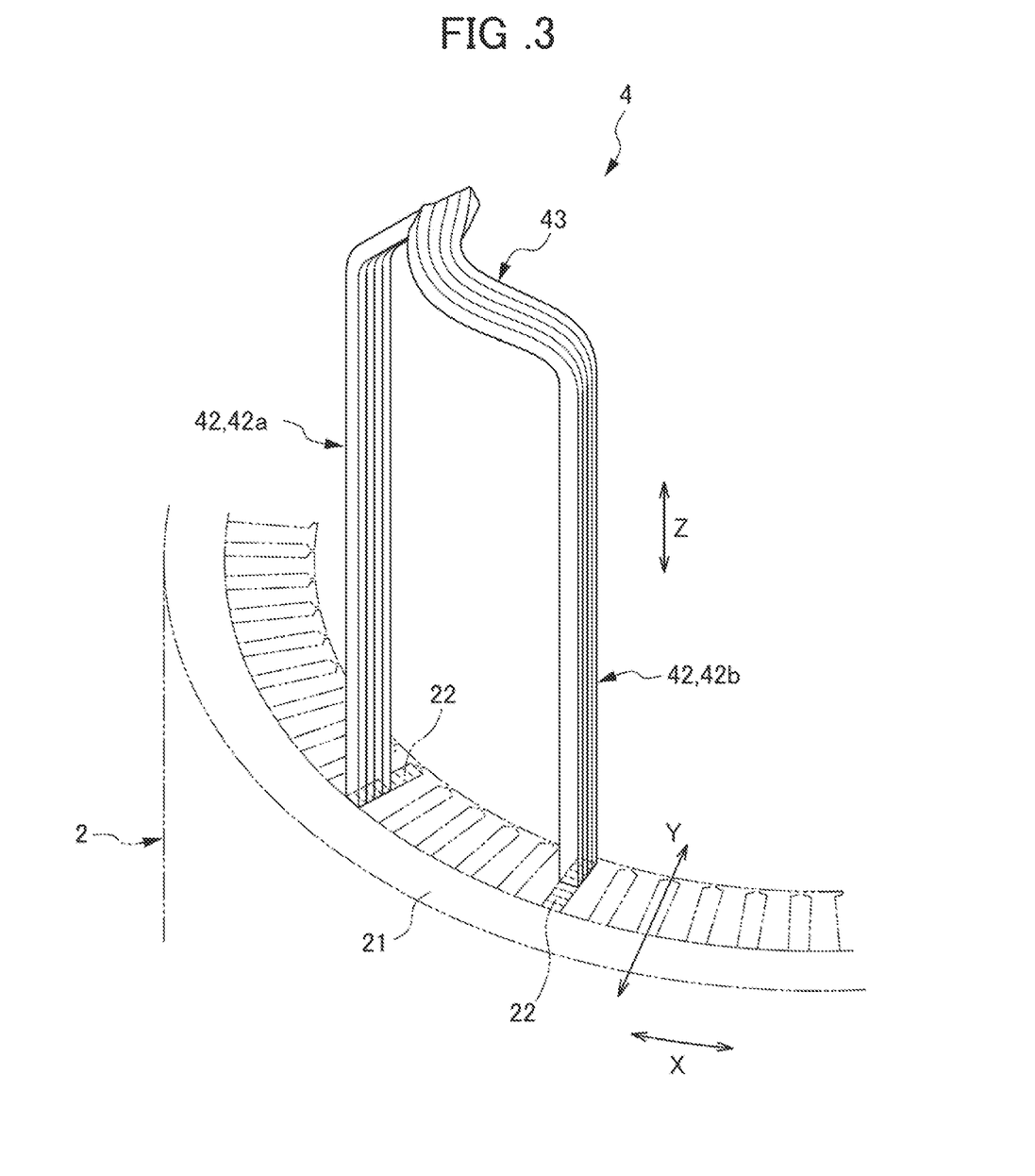
FIG. 3 is a perspective view illustrating a state in which the segment coil is inserted into slots of the stator core.

More specifically, the segment coil 4 before being inserted into the slots 22 in the stator core 2 includes a pair of parallel straight portions 42 (42*a*) and 42 (42*b*), and a U-shaped portion 43 that connects one end of the straight portion 42 (42*a*) and one end of the straight portion 42 (42*b*). As illustrated in FIG. 3, the segment coil 4 is mounted in the stator core 2 by inserting one straight portion 42 (42*a*) and the other straight portion 42 (42*b*) into the different slots 22 and 22, respectively. In one slot 22, there are inserted the straight portions 42 (42*a*) in the plurality of segment coils 4 and the straight portions 42 (42*b*) in the plurality of segment coils 4 of a different phase so as to overlap with each other in the radial direction of the stator core 2. Note that insulating paper is inserted into each slot 22 in the stator core 2, but the insulating paper is not illustrated in the stator core 2 illustrated in FIGS. 1 to 4.

Figure 4:
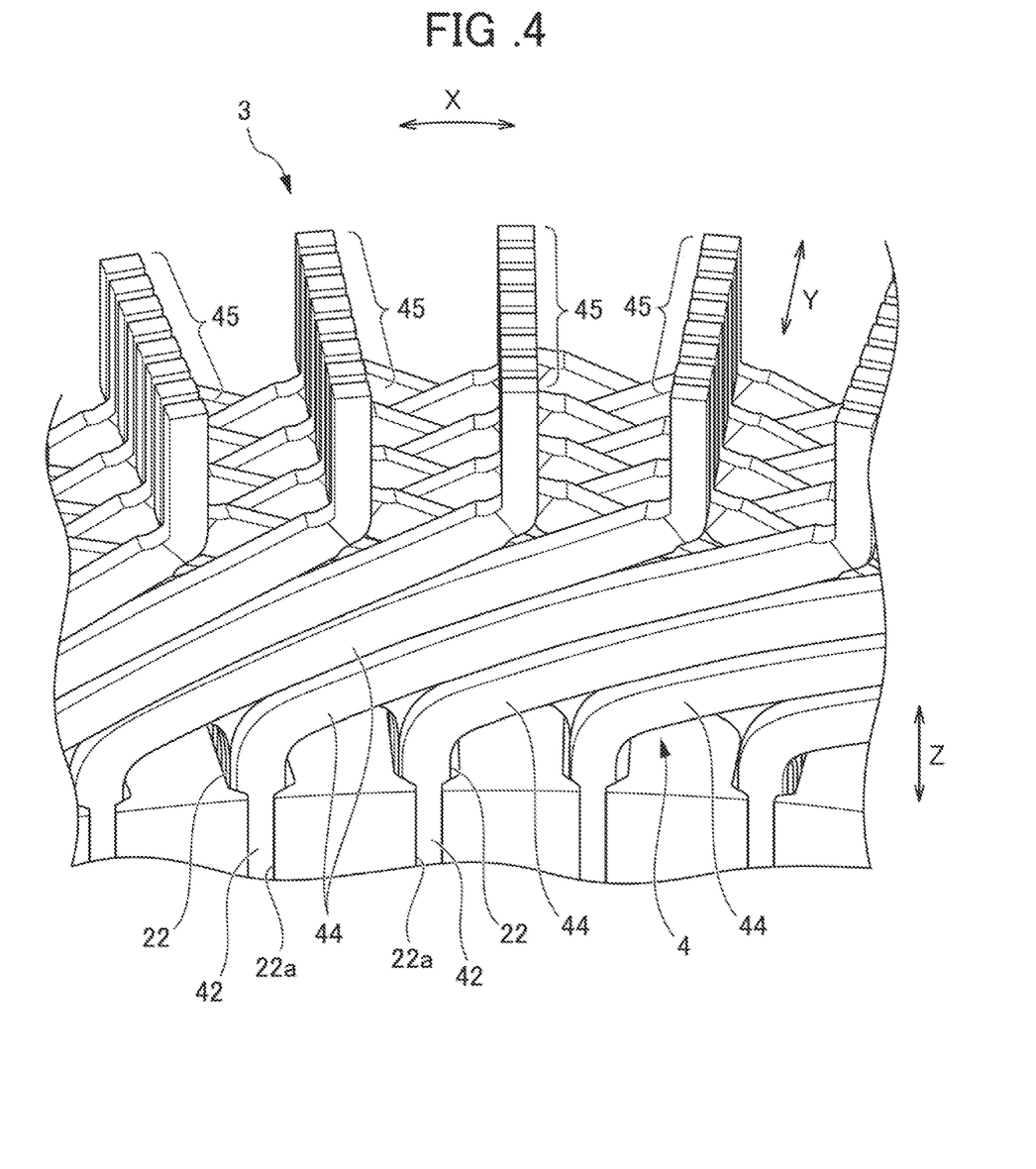
FIG. 4 is an enlarged perspective view illustrating connection sites of the segment coils in the stator.

As illustrated in FIG. 4, each of the segment coils 4 after being inserted into the respective slots 4 has an inclined portion 44 formed by bending the end of the straight portion 42 protruding from the slot 22 obliquely in the circumferential direction, and a rising portion 45 formed by bending a tip end side of the inclined portion 44 to rise in the axial direction of the stator core 2.

A pair of rising portions 45 and 45 in the segment coil 4 are arranged to overlap with each other in the radial direction of the stator core 2 by bending a pair of inclined portions 44 and 44 in a direction of coming closer to each other from the slots 22. Thus, each of the segment coils 4 is formed into an annular shape. The plurality of segment coils 4 are connected to each other in which the rising portions 45 and 45 in the segment coils 4 of a same phase that are arranged to overlap with each other in the radial direction of the stator core 2 are joined to each other by laser welding or the like.

Figure 5:
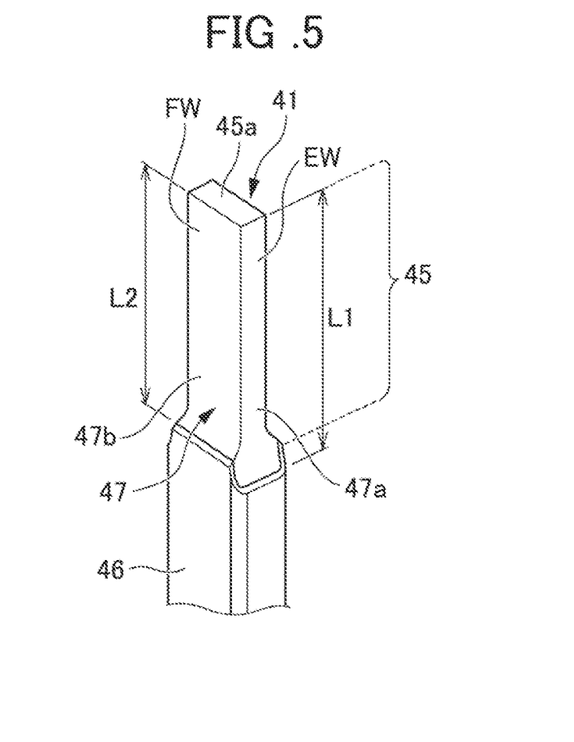
FIG. 5 is an enlarged perspective view illustrating one end of a segment coil according to a first embodiment.

As illustrated in FIG. 5, each of the segment coils 4 has an insulating film 46. FIG. 5 illustrates an end of one straight portion 42 in a segment coil 4 according to a first embodiment before forming the inclined portion 44 and the rising portion 45, but in the figure, a region corresponding to the rising portion 45 is represented with the reference sign. As illustrated in FIG. 5, a peeled portion 47 in which the insulating film 46 is peeled is provided in the rising portion 45 in the segment coil 4.

More specifically, a conductor of the segment coil 4 is made of a rectangular wire having a rectangular cross section as illustrated in FIG. 5, and has flatwise surfaces FW having a wide line width and edgewise surfaces EW having a narrow line width. When the segment coil 4 is inserted into the slot 22 in the stator core 2, the flatwise surface FW becomes a surface facing the radial direction of the stator core 2, and the edgewise surface EW becomes a surface facing the circumferential direction of the stator core 2. In the rising portion 45, the peeled portion 47 in which the insulating film 46 is peeled has first peeled portions 47*a* each in which the insulating film 46 on the edgewise surface EW is peeled in a lengthwise direction (an up-to-down direction in FIG. 5) from a tip end 45*a* of the rising portion 45 toward the inclined portion 44, and second peeled portions 47*b* each in which the insulating film 46 on the flatwise surface FW is peeled in the lengthwise direction from the tip end 45*a* of the rising portion 45 toward the inclined portion 44.

A peeling length L1 of the first peeled portion 47*a* is longer than a peeling length L2 of the second peeled portion 47*b*. Since when the rising portion 45 is bent, the first peeled portions 47*a* are arranged outside and inside in the bending direction, respectively, the damage to the insulating film 46 outside and inside in the bending direction can be prevented by extending the peeling length of the first peeled portion 47*a* even when the peeling length of the second peeled portion 47*b* is formed short (coating length of the insulating film 46 on the flatwise surface FW is left long) to ensure the insulation properties by the insulating film 46. Since the peeling length of the second peeled portion 47*b* is short, the second peeled portion 47*b* can be prevented from intersecting the inclined portion 44 in the segment coil 4 that is adjacent in the radial direction of the stator core 2. This makes it possible to form the stator 1 having good insulation properties even when the insulating film 46 is formed with a small thickness.

Figure 6:
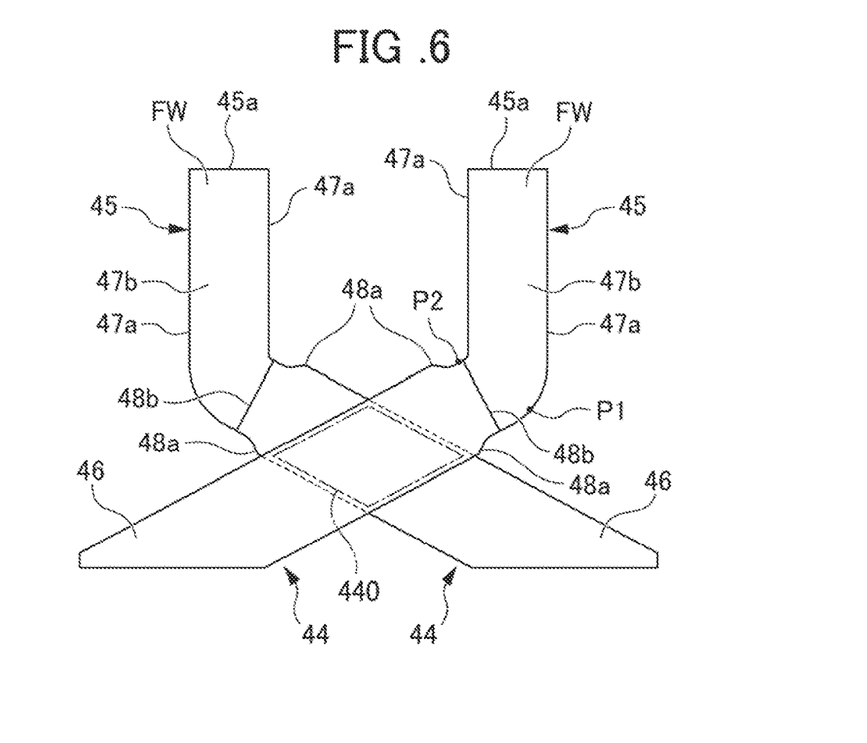
FIG. 6 is a front view illustrating an intersection between inclined portions in the respective segment coils according to the first embodiment.

As illustrated in FIG. 6, a first boundary portion 48*a* between the first peeled portion 47*a* and the insulating film 46 is arranged on the inclined portion 44 side with respect to both of a bent position P1 outside the rising portion 45 and a bent position P2 inside the rising portion 45. This can reliably prevent the insulating film 46 from being present in the bent site of the rising portion 45 in the edgewise surfaces EW. Accordingly, the damage to the insulating film 46 can be reliably prevented when the rising portion 45 is formed.

Figure 7:
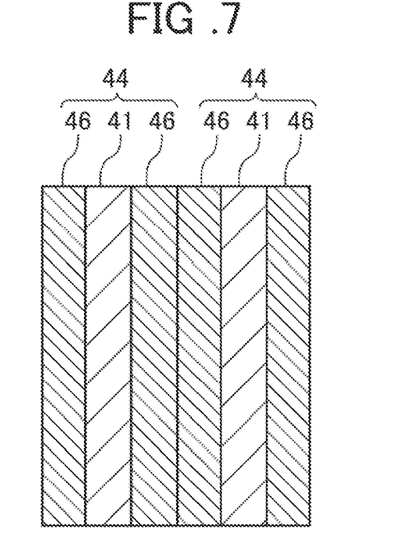
FIG. 7 is a schematic diagram of a cross section of the intersection between the inclined portions in the respective segment coils according to the first embodiment.

As illustrated in FIG. 6, the inclined portions 44 and 44 of the respective segment coils 4 and 4 of a different phase that are adjacent to each other in the radial direction (a vertical direction to a paper surface of FIG. 6) of the stator core 2 are arranged to intersect each other, and form an intersection 440 substantially into a lozenge shape. At this time, each second boundary portion 48*b* between the second peeled portion 47*b* and the insulating film 46 is arranged on the tip end 45*a* side of the rising portion 45 with respect to the intersection 440. This can reliably prevent each second peeled portion 47*b* from being arranged in the intersection 440 and intersecting the inclined portion 44. In the intersection 440, as illustrated in FIG. 7, since the insulating films 46 and 46 of the respective segment coils 4 and 4 that are adjacent to each other are present between the conductors 41 and 41 of the respective segment coils 4 and 4, there is no risk that partial discharge occurs. Therefore, it possible to form the insulating film 46 with a smaller thickness.

Figure 8:
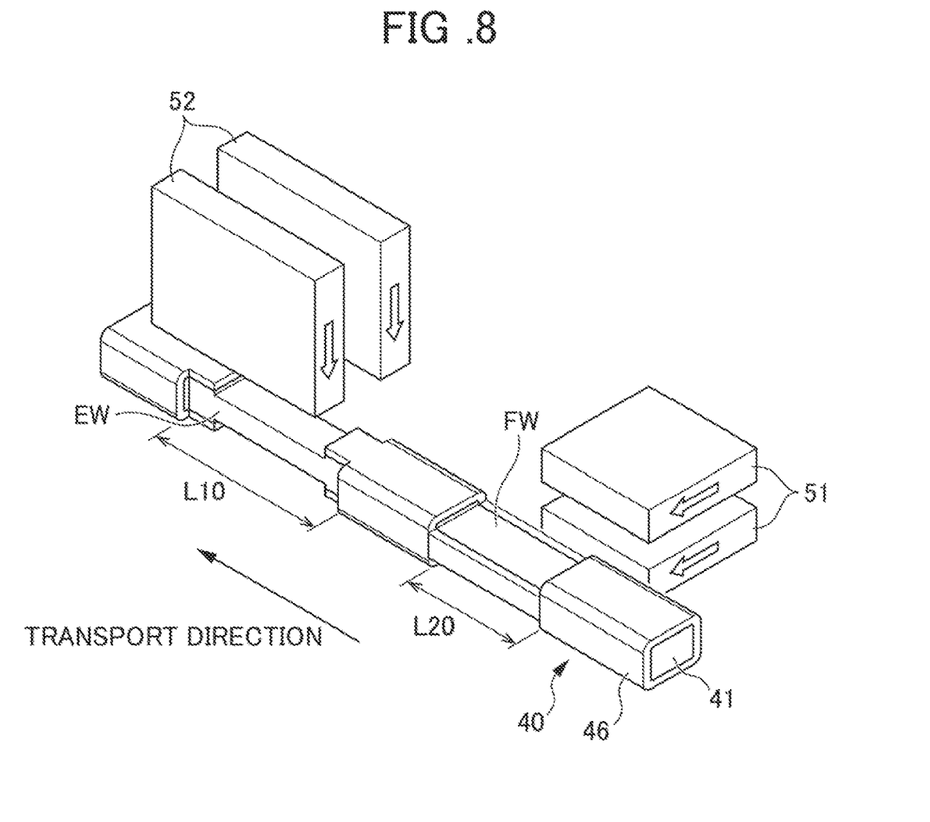
FIG. 8 is a diagram illustrating a method of peeling an insulating film of the segment coil according to the first embodiment.

FIG. 8 illustrates an aspect of a peeling step of providing the peeled portion 47 in the segment coil 4 in a method of manufacturing the stator 1. First, a pair of peeling molds 51 are moved along the flatwise surfaces FW and in a direction perpendicular to an extending direction of a coil strand 40 with respect to the coil strand 40 in which the insulating film 46 is formed on a surface of the conductor 41 to cut off the insulating film 46 and a part of the conductor 41 on the flatwise surfaces FW over a peeling length L20. Next, a pair of peeling molds 52 are moved along the edgewise surfaces EW of the site cut off by the peeling molds 51 and in the direction perpendicular to the extending direction of the coil strand 40 to cut off the insulating film 46 and a part of the conductor 41 on the edgewise surfaces EW over a peeling length L10. That is, L10>L1 and L20>L2 are established.

Next, after the coil strand 40 is cut at the site where the insulating film 46 is cut off so that the site where the insulating film 46 is cut off has a desired length. Afterwards, the segment coil 4 having the straight portions 42 and 42 and the U-shaped portion 43 is formed by forming the cut coil strand 40 substantially into a U shape. As illustrated in FIG. 5, the peeled portion 47 in which a part of the conductor 41 including the insulating film 46 is cut off is formed at the end of the straight portion 42, 42, by cutting the coil strand 40 at the site where the insulating film 46 is cut off. The first peeled portions 47a and the second peeled portions 47b as illustrated in FIG. 5 are formed in the rising portion 45 at the end of the straight portion 42, 42 by appropriately setting the peeling lengths L20 and L10 by the peeling molds 51 and 52 and a cutting position of the site where the insulating film 46 is cut off.

Note that the order of cutting off the insulating film 46 is not limited to the above-described order. Accordingly, the insulating film 46 on the flatwise surfaces FW may be cut off by the peeling molds 51 after the insulating film 46 on the edgewise surfaces EW is first cut off by the peeling molds 52.

Figure 9:
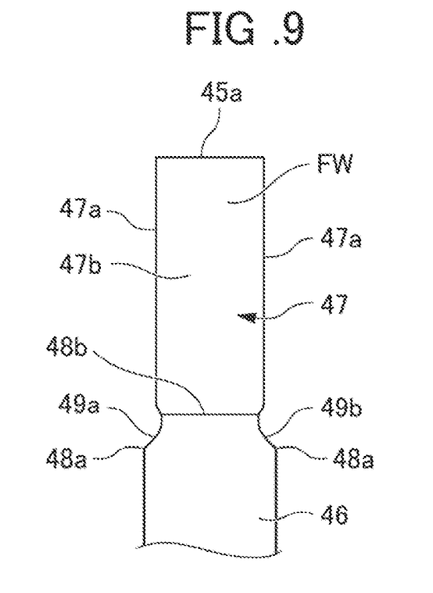
FIG. 9 is an enlarged front view illustrating one end of a segment coil according to a second embodiment.
Figure 10:
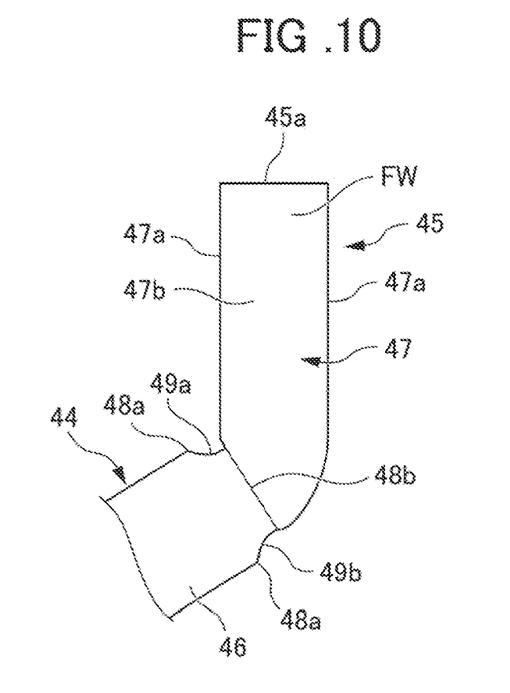
FIG. 10 is a front view illustrating a state in which one end of the segment coil according to the second embodiment is bent.

FIGS. 9 and 10 each illustrate a rising portion 45 of a segment coil 4 according to a second embodiment when viewed from a flatwise surface FW side. Sites with the same reference signs as those in the segment coil 4 according to the first embodiment are sites having the same configuration, and thus the aforementioned description is used as specific description of those sites and is omitted here.

In the segment coil 4, the first peeled portion 47a has a constricted portion 49a, 49b in the vicinity of the corresponding first boundary portion 48a between the first peeled portion 47a and the insulating film 46.
the constricted portions 49a and 49b are sites where the line width of the flatwise surface FW is formed to be partially narrow in the site adjacent to the tip end 45a side of the rising portion 45 with respect to the respective first boundary portions 48a. In this way, the use of the constricted portions 49a and 49b as notches enables the rising portion 45 to be easily bent. In addition, as illustrated in FIG. 10, the compression stress hardly acts on the constricted portion 49a located inside in the bending direction, which makes it possible to prevent radial expansion of the segment coil 4 from occurring inside in the bending direction due to the compression stress.

Such constricted portions 49a and 49b can be formed at the same time as the first peeled portions 47a in the above-described peeling step by forming the peeling molds 52 for forming the first peeled portions 47a into the shapes corresponding to the respective constricted portions 49a and 49b.

As described above, the stator 1 of the present embodiment includes the stator core 2 having the plurality of slots 22, and the plurality of segment coils 4, each of which is to be inserted into the slots and has the insulating film 46. The stator is formed in which each of the plurality of segment coils 4 includes the inclined portion 44 that protrudes from the slot 22 to the outside in the axial direction of the stator core 2 and is bent obliquely in the circumferential direction of the stator core 2, and the rising portion 45 formed by bending the tip end side of the inclined portion 44 to rise in the axial direction of the stator core 2, and the rising portions 45 and 45 that are adjacent to each other in the radial direction of the stator core 2 are joined to each other. Each of the plurality of segment coils 4 includes the first peeled portions 47a each in which the insulating film 46 facing the circumferential direction of the stator core 2 is peeled in the lengthwise direction from the tip end 45a of the rising portion 45 toward the inclined portion 44, and the second peeled portions 47b each in which the insulating film 46 facing the radial direction of the stator core 2 is peeled in the lengthwise direction from the tip end 45a of the rising portion 45 toward the inclined portion 44, and the peeling length L1 of the first peeled portion 47a is longer than the peeling length L2 of the second peeled portion 47b. This makes it possible to form the stator 1 having good insulation properties even when the insulating film 46 is formed with a small thickness, by preventing damage to the insulating film 46 arranged outside and inside in the bending direction when the rising portion 45 in the segment coil 4 is bent in the circumferential direction of the stator core 2 to rise, and, at the same time, preventing the peeled portion 47 from intersecting the segment coil 4 that is adjacent in the radial direction of the stator core 2.

The first boundary portion 48a between the first peeled portion 47a and the insulating film 46 of the present embodiment is arranged on the inclined portion 44 side with respect to the bent positions P1 and P2 of the rising portion 45. This can reliably prevent the insulating film 46 from being present in the bent site of the rising portion 45. Accordingly, the damage to the insulating film 46 can be prevented more reliably.

The inclined portions 44 and 44 of the respective segment coils 4 and 4 that are adjacent to each other in the radial direction of the stator core 2 of the present embodiment are arranged to intersect each other, and each second boundary portion 48b between the second peeled portion 47b and the insulating film 46 is arranged on the tip end 45a side of the rising portion 45 with respect to the intersection 440 between the inclined portions 44 and 44. This can more reliably prevent the second peeled portion 47b from intersecting the inclined portion 44 in the segment coil 4 that is adjacent in the radial direction of the stator core 2.

The first peeled portion 47a of the present embodiment has a constricted portion 49a, 49b in the vicinity of the corresponding first boundary portion 48a between the first peeled portion 47a and the insulating film 46. Accordingly, the use of the constricted portions 49a and 49b enables the rising portion 45 to be bent, and thus the rising portion 45 can be easily bent and formed, and the compression stress hardly acts on the inside in the bending direction, which makes it possible to prevent radial expansion of the segment coil 4 from occurring inside in the bending direction due to the compression stress.

A method of manufacturing the stator 1 of the present embodiment is a method of manufacturing the stator 1 including the stator core 2 having the plurality of slots 22, and the plurality of segment coils 4, each of which is to be inserted into the slots and has the insulating film 46, the plurality of segment coils 4 each including the inclined portion 44 that protrudes from the slot 22 to the outside in the axial direction of the stator core 2 and is bent obliquely in the circumferential direction of the stator core 2, and the rising portion 45 formed by bending the tip end side of the inclined portion 44 to rise in the axial direction of the stator core 2, the rising portions 45 and 45 that are adjacent to each other in the radial direction of the stator core 2 being joined to each other. The method includes a peeling step of forming, in each of the plurality of segment coils 4 before being inserted into the slots 22, the first peeled portions 47a each in which the insulating film 46 facing the circumferential direction of the stator core 2 is peeled in the lengthwise direction from a site corresponding to the tip end 45a of the rising portion 45 toward a site corresponding to the inclined portion 44, and the second peeled portions 47b each in which the insulating film 46 facing the radial direction of the stator core 2 is peeled in the lengthwise direction from a site corresponding to the tip end 45a of the rising portion 45 toward a site corresponding to the inclined portion 44. In the peeling step, the peeling length L1 of the insulating film 46 of the first peeled portion 47a is longer than the peeling length L2 of the insulating film 46 of the second peeled portion 47b. This makes it possible to easily manufacture the stator 1 having good insulation properties even when the insulating film 46 is formed with a small thickness, by preventing damage to the insulating film 46 arranged outside and inside in the bending direction when the rising portion 45 in the segment coil 4 is bent in the circumferential direction of the stator core 2 to rise, and, at the same time, preventing the peeled portion 47 from intersecting the segment coil 4 that is adjacent in the radial direction of the stator core 2.

EXPLANATION OF REFERENCE NUMERALS

1 Stator
2 Stator core
22 Slot
4 Segment coil
44 Inclined portion
440 Intersection
45 Rising portion
45a Tip end
46 Insulating film
47a First peeled portion
47b Second peeled portion
48a First boundary portion
48b Second boundary portion
49a, 49b Constricted portion
L1, L2 Peeling length
P1, P2 Bent position

What is claimed is:

1. A stator comprising: a stator core having a plurality of slots; and a plurality of segment coils, each of which is to be inserted into the slots and has an insulating film,
the plurality of segment coils each including an inclined portion that protrudes from the slot to an outside in an axial direction of the stator core and is bent obliquely in a circumferential direction of the stator core, and a rising portion formed by bending a tip end side of the inclined portion to rise in the axial direction of the stator core, the rising portions that are adjacent to each other in a radial direction of the stator core being joined to each other,
wherein each of the plurality of segment coils includes:
first peeled portions each in which the insulating film facing the circumferential direction of the stator core is peeled in a lengthwise direction from a tip end of the rising portion toward the inclined portion; and
second peeled portions each in which the insulating film facing the radial direction of the stator core is peeled in the lengthwise direction from the tip end of the rising portion toward the inclined portion,
the first peeled portions are on edgewise surfaces having a first line width, and the second peeled portions are on flatwise surfaces having a second line width that is greater than the first line width,
the first peeled portions and the second peeled portions are arranged in different planes, the first peeled portions are each a surface facing the circumferential direction of the stator core, and the second peeled portions are each a surface facing the radial direction of the stator core, and
a peeling length of the first peeled portion is longer than a peeling length of the second peeled portion.

2. The stator according to claim 1, wherein
a first boundary portion between the first peeled portion and the insulating film is arranged on the inclined portion side with respect to a bent position of the rising portion.

3. The stator according to claim 1, wherein
the inclined portions in the segment coils that are adjacent to each other in the radial direction of the stator core are arranged to intersect each other, and
each second boundary portion between the second peeled portion and the insulating film is arranged on the tip end side of the rising portion with respect to an intersection.

4. The stator according to claim 1, wherein
the first peeled portion has a constricted portion in a vicinity of a corresponding first boundary portion between the first peeled portion and the insulating film.

5. A method of manufacturing a stator comprising a stator core having a plurality of slots; and a plurality of segment coils, each of which is to be inserted into the slots and has an insulating film,
the plurality of segment coils each including an inclined portion that protrudes from the slot to an outside in an axial direction of the stator core and is bent obliquely in a circumferential direction of the stator core, and a rising portion formed by bending a tip end side of the inclined portion to rise in the axial direction of the stator core, the rising portions that are adjacent to each other in a radial direction of the stator core being joined to each other,
the method comprising: a peeling step of forming, in each of the plurality of segment coils before being inserted into the slots, first peeled portions each in which the insulating film facing the circumferential direction of the stator core is peeled in a lengthwise direction from a site corresponding to a tip end of the rising portion toward a site corresponding to the inclined portion, and second peeled portions each in which the insulating film facing the radial direction of the stator core is peeled in the lengthwise direction from a site corresponding to the tip end of the rising portion toward a site corresponding to the inclined portion, wherein in the peeling step, a peeling length of the insulating film of the first peeled portion is longer than a peeling length of the insulating film of the second peeled portion and the first peeled portions are on edgewise surfaces having a first line width, and the second peeled portions are on flatwise surfaces having a second line width that is greater than the first line width, the first peeled portions and the second peeled portions are arranged in different planes, the first peeled portions are each a surface facing the circumferential direction of the stator core, and the second peeled portions are each a surface facing the radial direction of the stator core.

6. The stator according to claim 1, wherein the inclined portions of the segment coils of a different phase that are adjacent to each other are arranged to intersect each other.

7. The method of manufacturing a stator according to claim 5, wherein the inclined portions of the segment coils of a different phase that are adjacent to each other are arranged to intersect each other.

* * * * *